United States Patent [19]

Hefner, Jr.

[11] Patent Number: 4,668,745

[45] Date of Patent: May 26, 1987

[54] REACTION PRODUCTS OF SULFUR DIOXIDE AND EPOXY-CONTAINING MATERIALS

[75] Inventor: Robert E. Hefner, Jr., Lake Jackson, Tex.

[73] Assignee: The Dow Chemical Company, Midland, Mich.

[21] Appl. No.: 870,589

[22] Filed: Jun. 4, 1986

[51] Int. Cl.$^4$ .................... C08G 59/16; C08G 59/17; C08F 283/10
[52] U.S. Cl. .................................. 525/531; 525/524; 525/502; 528/88; 528/90; 528/92; 528/109; 528/364; 427/386
[58] Field of Search .................. 528/88, 90, 92, 109, 528/364; 525/524, 531, 502; 427/386

[56] References Cited

U.S. PATENT DOCUMENTS

| | | | |
|---|---|---|---|
| 3,839,282 | 10/1974 | Sweeny et al. | 528/109 |
| 4,049,745 | 9/1977 | Shuster et al. | 525/531 |
| 4,518,723 | 5/1985 | Woodson | 523/466 |

OTHER PUBLICATIONS

"Mechanism of Formation of Polyolefins Sulfones Initiated by Hydroperoxide" by Vanhaeren and Butler, *Polymer Preprints,* Am. Chem. Soc. Div. of Polymer Chemistry, vol. 6, No. 1 (Apr. 1965) pp. 709–715.

*Primary Examiner*—Earl Nielsen
*Attorney, Agent, or Firm*—J. G. Carter

[57] ABSTRACT

Novel compositions are prepared by reacting sulfur dioxide with the reaction product of a material having an average of more than one 1,2-epoxide group per molecule such as a diglycidyl ether of bisphenol A with a monoethylenically unsaturated monocarboxylic acid such as methacrylic acid in the presence of an oxidizing agent such as cumene hydroperoxide.

9 Claims, No Drawings

REACTION PRODUCTS OF SULFUR DIOXIDE AND EPOXY-CONTAINING MATERIALS

BACKGROUND OF THE INVENTION

The present invention provides novel reaction products of sulfur dioxide and a material containing both vinyl ester groups and 1,2-epoxy groups.

Preparation of epoxy resin and sulfur dioxide copolymers in the presence of an oxidizing agent which is capable of reacting with sulfur dioxide to form a catalyst for curing said epoxy resin is taught by W. D. Woodson in U.S. Pat. No. 4,518,723. Within the scope of the teachings of Woodson is the addition of monomeric materials including acrylic or vinyl monomers to the acid-curable epoxy resin followed by copolymerization with sulfur dioxide in the presence of an oxidizing agent.

G. Vanhaeren and G. B. Butler in *Polymer Preprints,* Volume 6, Number 1, pages 709–715, April 1965 polymerized acrylic acid or acrylamide with sulfur dioxide in the presence of t-butylhydroperoxide. Both reactions yielded only pure homopolymer, poly(acrylic acid) or poly(acrylamide), respectively, with only a trace of sulfur incorporation into the homopolymer, probably as the initiator (p. 714). It was observed that the polysulfone (copolymer with sulfur dioxide) of acrylic acid and acrylamide could not be obtained by free radical copolymerization in liquid sulfur dioxide because they had no donor-acceptor interaction of electrons with sulfur dioxide. In a low temperature reaction, acrylic acid and acrylamide gave a "flash" polymerization.

The present invention pertains to reaction products of sulfur dioxide with a material containing both vinyl ester groups and 1,2-epoxy groups. The compositions of the present invention provide an improvement in one or more of the properties selected from pencil hardness, surface tack reduction, methylethylketone resistance and impact resistance when compared to reaction products of sulfur dioxide with a vinyl ester of a di- or polyepoxide (contains two or more polymerizable ethylenically unsaturated groups per molecule). Furthermore, the compositions of the present invention provide the ability to thermally postcure thin film coatings thus giving improved properties when compared to reaction products of sulfur dioxide with an epoxy resin.

As a further advantage of the present invention, reaction products formed using mixtures of at least one material having at least one vinyl ester group and at least one 1,2-epoxy group per molecule, a material containing two or more 1,2-epoxy groups and a vinyl ester (containing two or more polymerizable ethylenically unsaturated groups) with sulfur dioxide provide a polymer network wherein under reaction conditions which form a homopolymer of the vinyl ester, chemical bonding of this homopolymer into the polymer network occurs. By way of contrast, when mixtures containing two or more epoxide groups, such as an epoxy resin, and a vinyl ester are polymerized with sulfur dioxide under reaction conditions which form a homopolymer of the vinyl ester, little, if any, chemical bonding of the homopolymer to the polymer network formed from polyepoxide and sulfur dioxide occurs. This can lead to decreased mechanical properties as well as migration, increased extractability or phase incompatibility of the homopolymer.

SUMMARY OF THE INVENTION

The present invention pertains to the product resulting from reacting (A) the reaction product of (1) a material having an average of more than one 1,2-epoxide group per molecule and (2) a monoethylenically unsaturated monocarboxylic acid; with (B) sulfur dioxide in the presence of (C) an oxidizing agent capable of reacting with sulfur dioxide; wherein components (A-1) and (A-2) are present in quantities which provide a ratio of moles of component (A-2) per epoxide group contained in component (A-1) of from about 0.01:1 to about 0.9:1, preferably from about 0.1:1 to about 0.75:1; component (B) is employed in an amount sufficient to react with at least a sufficient number of the epoxide groups such that the surface of the resultant product is non-tacky; and component (C) is present in quantities of from about 5 to about 50 percent by weight of component (A).

Another aspect of the present invention pertains to a method for applying a protective coating to metallic substrates which process comprises (I) applying to said substrate a composition which comprises (A) the reaction product of (1) a material having an average of more than one 1,2-epoxide group per molecule and (2) a monoethylenically unsaturated monocarboxylic acid; (B) an oxidizing agent capable of reacting with sulfur dioxide; optionally (C) an inert diluent or solvent or mixture of inert diluents or solvents; and optionally (D) an accelerator or mixture of accelerators for a free radical forming catalyst and (II) subjecting the thus coated substrate to an atmosphere containing (E) sulfur dioxide in a sufficient quantity and for a sufficient time at a suitable temperature so as to substantially complete a reaction between the epoxide groups contained in the reaction product of component (A-1) and (A-2) as evidenced by the surface of the coating becoming non-tacky; wherein components (A-1) and (A-2) are present in quantities which provide a ratio of moles of component (A-2) per epoxide group contained in component (A-1) of from about 0.01:1 to about 0.9:1, preferably from about 0.1:1 to about 0.75:1; and component (B) is present in quantities of from about 5 to about 50 percent by weight of component (A); component (C), if present, is employed in quantities of from about 5 to about 99, preferably from about 10 to about 30 percent by weight of the combined weight of components (A), (B) and (C); and component (D), if present, is employed in quantities of from about 0.001 to about 1 percent by weight of component (A).

Another aspect of the present invention pertains to the product resulting from subjecting the substrate coated as above to a temperature of from about 50° C. to about 250° C. for from about 0.08 min. to about 60 minutes.

DETAILED DESCRIPTION OF THE INVENTION

In the preparation of the compositions of the present invention, the specified reactants are brought together at a time and temperature sufficient to essentially complete the reaction. A contact time of a fraction of a second to about 5 minutes (300 s) of the sulfur dioxide gas stream with the other reactants is generally adequate to complete the polymerization. Reaction temperatures of from about 25° C. to about 200° C. are operable with temperatures of about 25° C. being most preferred. Additionally, the reaction may be carried out under pressure, although this is not required.

Suitable materials having an average of more than one 1,2-epoxide group per molecule which can be employed herein include those represented by the following formulas (I), (II), (III) and (IV) and mixtures thereof

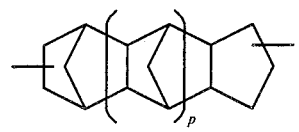
(I)

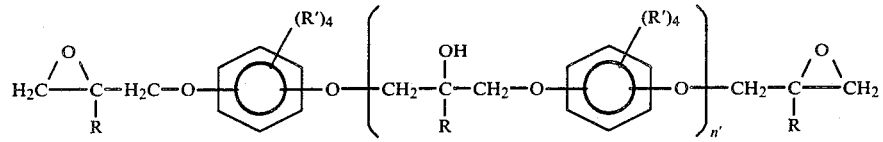
(II)

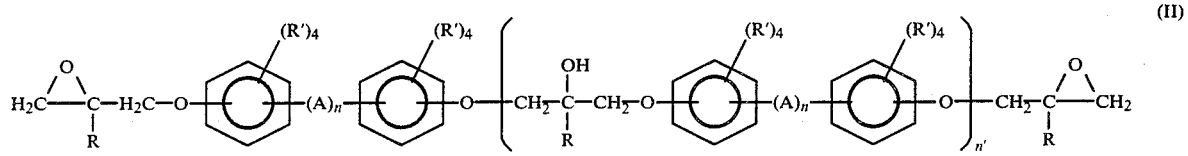
(III)

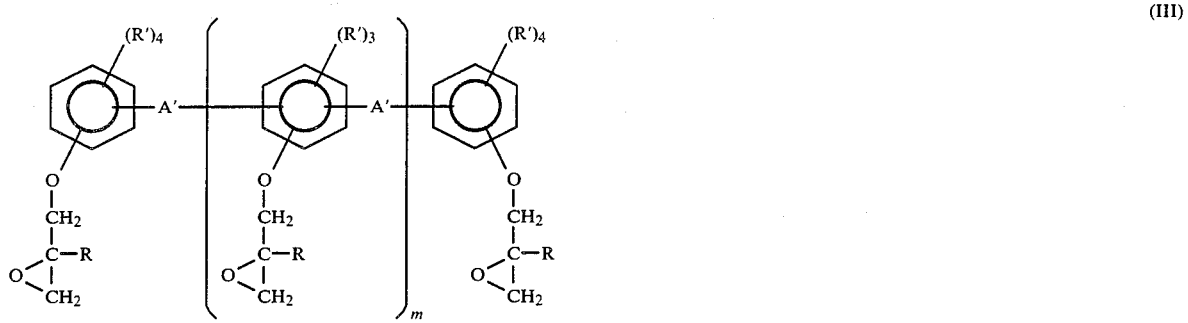
(IV)

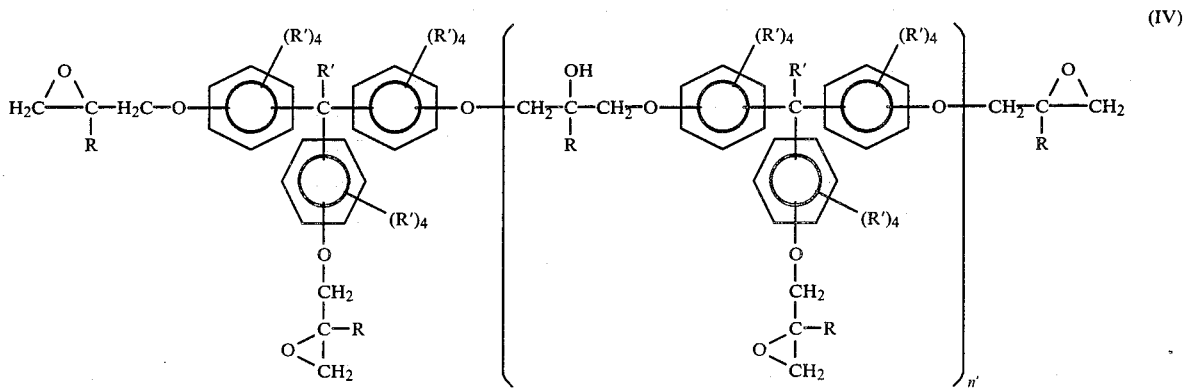

wherein each A is independently a divalent hydrocarbon group having from 1 to about 12, preferably from 1 to about 6 carbon atoms,

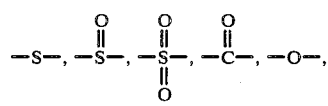

and the like; each A' is independently a divalent hydrocarbon group having from 1 to about 3, preferably 1, carbon atoms or a group; p has a value of from zero to about 10, preferably from zero to 3; each R' is independently hydrogen, a hydrocarbyl or hydrocarbyloxy group having from 1 to about 18 carbon atoms or a halogen, preferably chlorine or bromine; R is independently hydrogen or a hydrocarbyl group having from 1 to about 3 carbon atoms; n has a value of zero or 1; n' has a value from zero to about 40, preferably from 0.1 to about 5; and m has a value from about 0.001 to about 6.

Suitable monoethylenically unsaturated monocarboxylic acids for reaction with the epoxy resin include, for example, acrylic acid, methacrylic acid, cyanoacrylic acid, crotonic acid, phenylacrylic acid, methoxyacrylic acid, the monomethyl ester of fumaric acid, cinnamic acid and the like or mixtures thereof. Acrylic and methacrylic acid are most preferred as the monoethylenically unsaturated monocarboxylic acid.

The reaction between the polyepoxide and the monoethylenically unsaturated monocarboxylic acid is typically performed in the presence of a catalyst. Suitable catalysts for use herein are well known in the prior art. Suitable such catalysts are disclosed in U.S. Pat. Nos. 3,564,074, 3,377,406, 3,933,935 and 4,141,865 which are incorporated herein by reference. Chromium trichloride is most preferred as the catalyst. A quantity of from about 0.01 to about 2 percent by weight has been found to be a particularly suitable quantity of catalyst with concentrations of 0.1 to about 0.3 weight percent of total reactants used being most preferred.

A suitable process inhibitor is typically used in the reaction between the polyepoxide and the monoethylenically unsaturated monocarboxylic acid to prevent gelation (homopolymerization of the vinyl ester groups and/or copolymerization of the vinyl ester groups with unreacted monoethylenically unsaturated monocarboxylic acid). Suitable inhibitors for use herein are well known in the art. Hydroquinone activated with air is a most preferred inhibitor at concentrations of from about 100 ppm to about 500 ppm based on the weight of the polyepoxide and monoethylenically unsaturated monocarboxylic acid used.

The reaction between the epoxy-containing material and the monoethylenically unsaturated monocarboxylic acid is usually conducted at a temperature of from about 50° C. to about 125° C., preferably from about 80° C. to about 120° C. for from about 30 minutes (1800 s) to about 720 minutes (43,200 s), preferably from about 60 minutes (3600 s) to about 480 minutes (28,800 s). Although reaction times and reaction temperatures can vary substantially, most preferred compositions are obtained by reacting to a specific conversion, typically 1.5 to zero percent carboxylic acid.

Control of the mole ratio of carboxylic acid to epoxy groups used in the aforesaid reaction provides compositions which vary in the amount of the specific components present. For example, the use of low mole ratios of carboxylic acid to epoxide groups, such as, for example, 0.01:1, provides a product containing a small amount of material containing at least one vinyl ester group and at least one 1,2-epoxy group and a large amount of material containing two or more 1,2-epoxy groups, with essentially no material containing two or more vinyl ester groups present. Increasing the mole ratio of carboxylic acid to epoxy groups concurrently decreases the amount of material containing two or more 1,2-epoxy groups while increasing the amount of material containing at least one vinyl ester group and at least one 1,2-epoxide group and the amount of material containing two or more vinyl ester groups. Isolation and separation methods well known to the prior art may be used to recover individual components from these mixtures, such as, for example, the material containing at least one vinyl ester group and at least one 1,2-epoxy group.

The reaction product of the epoxy-containing material and the monoethylenically unsaturated monocarboxylic acid may be combined with one or more non-reactive diluents. Said non-reactive diluents are typically solvents which do not react with vinyl ester or epoxide groups. Suitable such non-reactive diluents include, for example, the chlorinated hydrocarbons, such as methylene chloride or methyl chloroform; the aromatic hydrocarbons, such as toluene; and the aliphatic ketones, such as methylethylketone and methylisobutylketone. The amount of non-reactive diluent used varies depending on the end use of the product, but as much as 99 percent by weight of the total components may be the non-reactive diluent. For product solutions to be used to provide thin film protective coatings, for example, on a metal substrate, non-reactive diluent contents of 5 to about 50, preferably 10 to about 30 percent by weight are typically employed.

Oxidizing agents capable of reacting with sulfur dioxide include hydroperoxides, peroxides, bis(hydroperoxides), bis(peroxides), perchlorates, persulfates, permanganates, chlorates, mixtures thereof and the like. The organic hydroperoxides and peroxides are most preferred as the oxidizing agent. Examples of useful hydroperoxides include t-butylhydroperoxide, cumene hydroperoxide, and the like. Examples of useful peroxides include benzoyl peroxide, di-tert-butyl peroxide, t-butylperbenzoate, methylethylketone peroxide, t-butylperoctoate, dicumyl peroxide, lauroyl peroxide and the like.

The oxidizing agent is added to the reaction product of the epoxy-containing material and the monoethylenically unsaturated monocarboxylic acid prior to reaction with sulfur dioxide. The amount of oxidizing agent used to prepare the compositions of the present invention varies from about 5 to about 50 percent by weight based on the aforesaid reaction product.

The aforementioned non-reactive diluent which may be used herein can be removed prior to addition of the oxidizing agent or it may be present when the oxidizing agent is added, provided that it does not react with the oxidizing agent. In addition to the aforesaid oxidizing agent, any of the known accelerators for free radical forming catalysts, such as cobalt naphthenate, N,N-dimethylaniline, mixtures thereof and the like may be added.

The sulfur dioxide used to prepare the compositions of the present invention is typically employed as a gaseous reactant, either neat, or diluted with inert gases, such as air or nitrogen. It is also operable, although less preferred, to absorb the sulfur dioxide into an inert solvent for use as a reactant in the present invention.

Various additives may also be incorporated into the compositions of the present invention to serve their known and intended purpose. Such additives, include, for example, flow control agents, such as, for example, the polyacrylates and urea-formaldehyde copolymers; fillers, such as, for example, sand, metal oxides, silica powder and calcium carbonate; pigments and dyes; fire suppressants; low profile additives; texture control agents, coupling agents, such as, for example, silanes or titanates, mixtures thereof and the like.

If desired, the compositions of the present invention can additionally contain added epoxy resins such as, for example, those represented by formulas I, II, III, IV; one or more polymerizable ethylenically unsaturated monomer such as, for example, esters of acrylic and methacrylic acid, styrene, vinyl toluene and the like; or vinyl esters known to those skilled in the art. Suitable such vinyl esters are disclosed in U.S. Pat. Nos. 3,367,992; 3,066,112; 3,179,623; 3,301,743; and 3,256,226 which are incorporated herein by reference.

The compositions of the present invention have properties which make them well adapted for use as thin film coatings, for example, as protective coatings on metal surfaces. Typical of this use is the coating of a steel part with the mixture of all reactants excluding sulfur dioxide, followed by placing the coated part in a sealed chamber then metering in the sulfur dioxide reactant. The resulting part is thus coated with a tough corrosion resistant polymer film. As coating thickness is increased to above about 1 mil, incomplete curing after reaction with the gaseous sulfur dioxide may be encountered but may be completed by post curing at a temperature of from about 50° C. to about 250° C. for from about 0.08 minute to about 60 minutes. Unlike the epoxy resin and sulfur dioxide reaction products of the prior art, post curing of the incompletely cured part serves to complete the cure without damaging the smooth finish inherent to the coatings of the present invention.

The following examples are illustrative of the invention, but are not to be construed as to limiting the scope in any manner.

EXAMPLE 1

A.

Synthesis of Epoxy Resin Partial Methacrylate

A portion (600 grams, 3.343 epoxide equiv.) of a diglycidyl ether of bisphenol A having an epoxide equivalent weight (EEW) of 179.5 and bisphenol A (208.6 grams, 1.827 equiv.) were added to a reactor and heated to 90° C. with stirring. Tetrabutylphosphonium bromide.acetic acid complex (70% solids in methanol) (0.51 gram) was added and heating to 150° C. commenced under a nitrogen atmosphere. After 1.5 hours (5400 s) at the 150° C. reaction temperature, the resultant epoxy resin had an EEW of 535. After establishing an air sparge (0.5 liter per minute), hydroquinone (0.250 gram) and a mixture of methacrylic acid (127.3 grams, 1.479 moles) and diglycidyl ether of bisphenol A (179.5 EEW) (259.9 grams, 1.448 epoxide equiv.) were sequentially added. After 5 minutes (300 s), 33.33 percent aqueous chromium trichloride catalyst (0.86 gram) was added and the reaction temperature was stabilized at 117° C. After 170 minutes (10,200 s) at the 117° C. reaction temperature, titration of a sample of the epoxy resin partial methacrylate demonstrated the presence of 0.47 percent carboxylic acid and 5.41 percent epoxide. Infrared spectrophotometric analysis of a film sample of the product confirmed the presence of the ester functionality and the epoxide functionality. Oxalic acid (0.48 gram) was added to the reactor, then the reactor contents were cooled to 90° C. and 4-chloro-2-nitrophenol (0.240 gram), phenothiazine (0.330 gram) and methylethylketone solvent (299.6 grams) were sequentially added. The reactor contents were allowed to stir until a transparent, pale green colored solution of epoxy resin partial methyacrylate (80 percent solids in methylethylketone) was recovered.

B.

Reaction of Epoxy Resin Partial Methacrylate with with Sulfur Dioxide

A portion of the epoxy resin partial methacrylate dissolved in methylethylketone from A above (50.0 grams) and cumene hydroperoxide (85 percent solution, 8.9 percent active oxygen) (13.33 grams, 25.0 percent by weight of the epoxy resin partial methacrylate used) were thoroughly mixed to provide a homogeneous solution. An aliquot of this solution was applied to a 4 inch by 12 inch by 20 gauge (101.6 mm×304.8 mm×0.813 mm) unpolished cold rolled steel Bonderite 40 treated Parker test panel using a number 10 drawdown bar. The coated panel was sealed into a gas tight chamber which was then placed under vacuum by evacuation of air. A stream of $SO_2$ gas was metered into the chamber until a pressure of 5 psig (34.5 kPa) was achieved. Fifteen seconds after achieving the 5 psig pressure, the chamber was purged with air, opened and the coated test panel removed. The resulting 0.5 mil (0.0127 mm) thick coating was transparent, tack free and possessed a smooth surface immediately after removal from the chamber. The panel was tested for pencil hardness and methylethylketone double rubs thirty minutes (1800 s) after removal from the chamber using the following procedures:

Pencil Hardness

This procedure is described in *Paint Testing Manual* by H. A. Gardner and G. G. Sward, 13th edition (1972) pages 283 and 284. Film hardness was determined by drawing a sharp pencil over each coating surface using leads ranging in hardness of softest to hardest: 6B, 5B, 4B, 2B, B, HB, F, H, 2H, 3H, 4H, 5H, 6H. The film hardness value recorded was the hardest lead which did not break the film coating.

Methylethylketone Double Rubs

To the ball end of a 2 pound ball peen hammer was attached a pad of cheese cloth made up of 8 plys. The cheese cloth end of the hammer was then saturated with methylethylketone. The pad end of the hammer was then drawn back and forth across the coated surface. One back and forth movement was considered as one methylethylketone double rub. The procedure was repeated until the film failed either by maring or if no mar occurred, by breakthrough, and the number of back and forth movements recorded. One back and forth movement is recorded as one double rub. The results are given in Table I.

COMPARATIVE EXPERIMENT A

A.

Synthesis of a Vinyl Ester

A portion (600 grams, 3.342 epoxide equiv.) of a diglycidyl ether of bisphenol A having an epoxide equivalent weight (EEW) of 179.5 and bisphenol A (208.6 grams, 1.827 equiv.) were added to a reactor and heated to 90° C. with stirring. Tetrabutylphosphonium bromide.acetic acid complex (70% solids in methanol) (0.51 gram) was added and heating to 150° C. commenced under a nitrogen atmosphere. After 1.5 hours (5400 s) at the 150° C. reaction temperature, the resultant epoxy resin had an EEW of 535. After establishing an air sparge (0.5 liter per minute), hydroquinone (0.277 gram) and a mixture of methacrylic acid (254.6 grams, 2.957 moles) and diglycidyl ether of bisphenol A (179.5 EEW) (259.9 grams, 1.448 epoxide equiv.) were sequentially added. After 5 minutes (300 s), 33.33 percent aqueous chromium trichloride catalyst (0.86 gram) was added and the reaction temperature was stabilized at 117° C. After 240 minutes (14,400 s) at the 117° C. reaction temperature, titration of a sample of the vinyl ester demonstrated the presence of 1.48 percent carboxylic acid and 0.91 percent epoxide. Oxalic acid (0.53 gram) was added to the reactor, then the reactor contents were cooled to 90° C. and 4-chloro-2-nitrophenol (0.265 gram), phenothiazine (0.362 gram) and methylethylketone solvent (331.46 grams) were sequentially added. The reactor contents were allowed to stir until a transparent, pale green colored solution of vinyl ester (80 percent solids in methylethylketone) was recovered.

B.

Reaction of Vinyl Ester with Sulfur Dioxide

A portion of the vinyl ester dissolved in methylethylketone from A above (50.0 grams) and cumene hydroperoxide (85 percent solution, 8.9 percent active oxygen) (13.33 grams, 25.0 percent by weight of the vinyl ester used) were thoroughly mixed to provide a homogeneous solution. An aliquot of this solution was applied to a 4 inch by 12 inch by 20 gauge (101.6 mm×304.8 mm×0.813 mm) unpolished cold rolled steel Bonderite 40 treated Parker test panel using a number 10 drawdown bar. The coated panel was sealed into a gas tight chamber which was then placed under vacuum by evacuation of air. A stream of SO₂ gas was metered into the chamber until a pressure of 5 psig (34.5 kPa) was achieved. Fifteen seconds after achieving the 5 psig (34.5 kPa) pressure, the chamber was purged with air, opened and the coated test panel removed. The resulting 0.5 mil (0.0127 mm) thick coating was transparent, tacky and possessed a smooth surface immediately after removal from the chamber. The panel was tested using the method of Example 1B. The results are given in Table I.

TABLE I

| | Example 1-B | Comparative Experiment A |
|---|---|---|
| Pencil Hardness | HB | fails 6B |
| Methylethylketone Double Rubs | 3 | none - soluble |
| Appearance | non-tacky smooth transparent colorless | tacky smooth transparent colorless |

EXAMPLE 2

Reaction of Epoxy Resin Partial Methacrylate with Sulfur Dioxide followed by Post Curing The method of Example 1-B was repeated to provide a coated panel. The resulting panel was placed in a 100° C. oven five minutes (300 s) after removal from the chamber and maintained therein for 45 minutes (2700 s). The resulting 0.5 mil (0.0127 mm) thick coating was transparent, tack free and possessed a smooth surface. The panel was tested for pencil hardness and methylethylketone double rubs using the method of Example 1-B. Gardner forward and reverse impact strengths were determined using the following procedure:

Gardner Impact Strength

Gardner forward and reverse impact strengths were determined per ASTM D2794 using a Gardner "Coverall" Bend and Impact Tester, 46 inch (1.17 m) tube length, 0–160 in.-lb. (0–18.1 J) tester, with a two pound (0.905 kg), one-half inch (12.7 mm) diameter cone. The reverse impact was determined by dropping the cone on the uncoated side of the panel. Visualization of any surface cracks at the impact sites was facilitated by application of an acidified copper sulfate (CuSO₄) solution for a period of 15 minutes (900 s). Impact areas were observed for copper deposits or iron-rust stains after exposure to the copper sulfate solution. The results are given in Table II.

COMPARATIVE EXPERIMENT B

Reaction of Vinyl Ester with Sulfur Dioxide Followed by Post Curing

The method of Comparative Experiment A was repeated to provide a coated panel. The resulting panel was placed in a 100° C. oven five minutes (300 s) after removal from the chamber and maintained therein for 45 minutes (2700 s). The resulting 0.5 mil (0.0127 mm) thick coating was transparent, tack free, light yellow colored and possessed a smooth surface. The panel was tested using the method of Exammple 2. The results are given in Table II.

TABLE II

| | Example 2 | Comparative Experiment B |
|---|---|---|
| Pencil Hardness | 2H | H |
| Methylethylketone Double Rubs | 40 | 40 |
| Gardner Impact, in.-lb. (J) | | |
| forward | 160 (18.1) | 96 (10.8) |
| reverse | 24 (2.7) | 12 (1.4) |
| Appearance | non-tacky smooth transparent colorless | non-tacky smooth transparent light yellow color |

EXAMPLE 3

Reaction of Epoxy Resin Partial Methacrylate with Sulfur Dioxide Using a Metal Accelerator A portion of the epoxy resin partial methacrylate dissolved in methylethylketone from Example 1-A (50.0 grams), cumene hydroperoxide (85 percent solution, 8.9 percent active oxygen) (13.33 grams, 25.0 percent by weight of the epoxy resin partial methacrylate used) and cobalt naphthenate (6.0 percent) (0.050 gram, 0.1 percent by weight of the epoxy resin partial methacrylate used) were thoroughly mixed to provide a homogeneous solution. An aliquot of this solution was used to prepare a coated panel using the method of Example 1-B. The resulting 0.5 mil (0.0127 mm) thick coating was transparent, tacky and possessed a smooth surface immediately after removal from the chamber. The panel was tested using the method of Example 1-B. The results are given in Table III.

COMPARATIVE EXPERIMENT C

Reaction of Vinyl Ester with Sulfur Dioxide Using a Metal Accelerator

A portion of the vinyl ester dissolved in methylethylketone from Comparative Experiment A (50.0 grams), cumene hydroperoxide (85 percent solution, 8.9 percent active oxygen) (13.33 grams, 25.0 percent by weight of the vinyl ester used) and cobalt naphthenate (6.0 percent) (0.050 gram, 0.1 percent by weight of the vinyl ester used) were thoroughly mixed to provide a homogeneous solution. An aliquot of this solution was used to prepare a coated panel using the method of Example 1-B. The resulting 0.5 mil (0.0127 mm) thick coating was transparent, tacky and possessed a smooth surface immediately after removal from the chamber. The panel was tested using the method of Comparative Experiment A. The results are given in Table III.

TABLE III

|  | Example 3 | Comparative Experiment C |
|---|---|---|
| Pencil Hardness | 5B at 1 hr. 4B at 24 hr. | failed 6B at 1 hr. and 24 hr. |
| Methylethylketone Double Rubs | not evaluated | not evaluated |
| Appearance | tacky smooth transparent colorless | tacky smooth transparent colorless |

EXAMPLE 4

Reaction of Epoxy Resin Partial Methacrylate with Sulfur Dioxide Using a Metal Accelerator Followed by Post Curing The method of Example 3 was repeated to provide a coated panel. The resulting panel was placed in a 100° C. oven five minutes (300 s) after removal from the chamber and maintained therein for 60 minutes (3600 s). The resulting 0.5 mil (0.0127 mm) thick coating was transparent, tack free, light amber colored and possessed a smooth surface. The panel was tested using the method of Example 2. The results are given in Table IV.

COMPARATIVE EXPERIMENT D

Reaction of Vinyl Ester with Sulfur Dioxide Using a Metal Accelerator Followed by Post Curing The method of Comparative Experiment C was repeated to provide a coated panel. The resulting panel was placed in a 100° C. oven five minutes (300 s) after removal from the chamber and maintained therein for 60 minutes (3600 s). The resulting 0.5 mil (0.0127 mm) thick coating was transparent, tack free, yellow colored and possessed a smooth surface. The panel was tested using the method of Example 2. The results are given in Table IV.

TABLE IV

|  | Example 4 | Comparative Experiment D |
|---|---|---|
| Pencil Hardness | F | F |
| Methylethylketone Double Rubs | 150 | 100 |
| Gardner Impact, in.-lb. (J) |  |  |
| forward | 80 (9) | 48 (5.4) |
| reverse | 12 (1.4) | 4 (0.5) |
| Appearance | non-tacky smooth transparent light amber color | non-tacky smooth transparent yellow color |

COMPARATIVE EXPERIMENT E

Reaction of an Epoxy Resin with Sulfur Dioxide

A portion of a diglycidyl ether of bisphenol A having an EEW of 179.5 (70.0 grams, 0.39 equiv.) and cumene hydroperoxide (85 percent solution, 8.9 percent active oxygen) (23.33 grams, 25.0 percent by weight of the epoxy resin used) were thoroughly mixed to provide a homogeneous solution. An aliquot of this solution was used to prepare a coated panel using the method of Example 1-B. The resulting 0.5 mil (0.0127 mm) thick coating was transparent, tacky at the edges (where film thickness was greater) and possessed a smooth surface immediately after removal from the chamber. The panel was tested using the method of Example 1-B. The results are reported in Table V.

TABLE V

| Pencil Hardness | 4H |
|---|---|
| Methylethylketone Double Rubs | 30 |
| Gardner Impact, in.-lb. (J) |  |
| forward | not determined |
| reverse | 80 (9) |
| Appearance | tacky edges smooth transparent colorless |

COMPARATIVE EXPERIMENT F

Reaction of Epoxy Resin with Sulfur Dioxide Followed by Post Curing

The method of Comparative Experiment E was repeated to provide a coated panel. The resulting panel was placed in a 100° C. oven five minutes (300 s) after removal from the chamber. After 30 minutes (1800 s) at the 100° C. temperature, the coating on the panel was severely wrinkled and crazed and could not therefore be tested further. In addition, the post curing did not alleviate the tackiness of the edges of the panel.

I claim:

1. The product resulting from reacting (A) the reaction product of (1) a material having an average of more than one 1,2-epoxide group per molecule and (2) a monoethylenically unsaturated monocarboxylic acid; with (B) sulfur dioxide in the presence of (C) an oxidizing agent capable of reacting with sulfur dioxide; wherein components (A-1) and (A-2) are present in quantities which provide a ratio of moles of component (A-2) per epoxide group contained in component (A-1) of from about 0.01:1 to about 0.9:1; component (B) is employed in an amount sufficient to react with at least a sufficient number of the epoxide groups such that the surface of the resultant product is non-tacky; and component (C) is present in quantities of from about 5 to about 50 percent by weight of component (A).

2. The product of claim 1 wherein
   (i) component (A-1) is an epoxy resin represented by the following formulas (I), (II), (III) or (IV) or a combination thereof

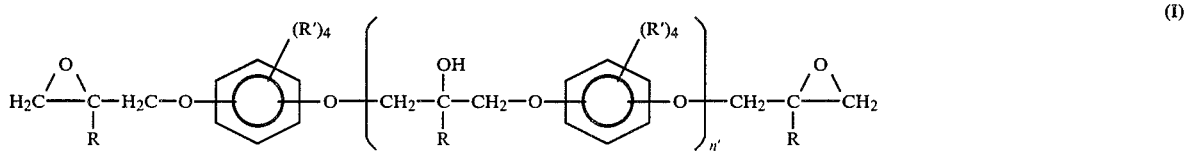

(I)

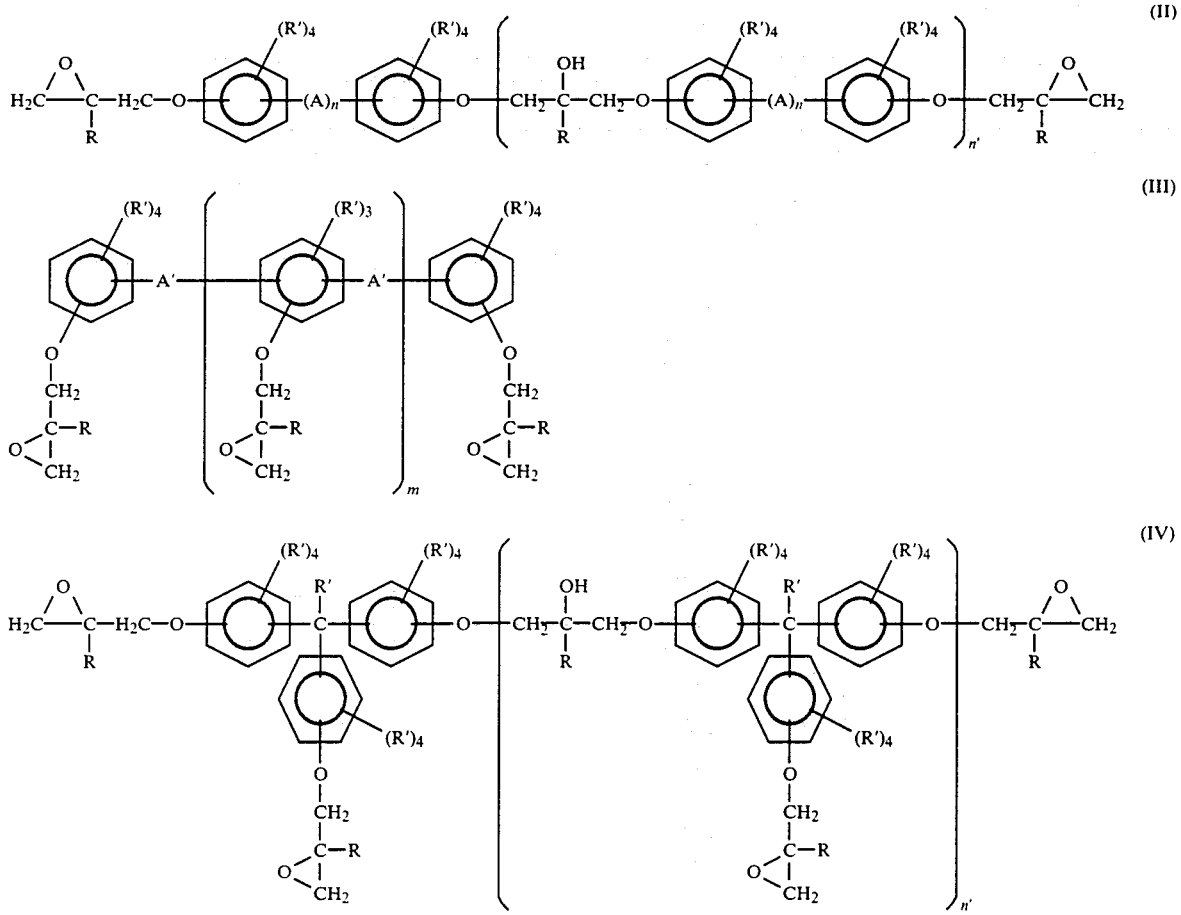

wherein each A is independently a divalent hydrocarbon group having from 1 to about 12 carbon atoms,

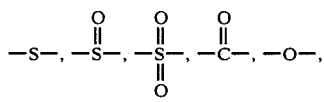

and is independently a divalent hydrocarbon group having from 1 to about 3 carbon atoms or a

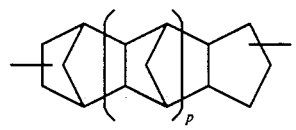

group; each p has a value of from zero to about 10; each R' is independently hydrogen, a hydrocarbyl or hydrocarbyloxy group having from 1 to about 18 carbon atoms or a halogen; R is independently hydrogen or a hydrocarbyl group having from 1 to about 3 carbon atoms; n has a value of zero or 1; n' has a value from zero to about 40; and m has a value from about 0.001 to about 6;

(ii) components (A-1) and (A-2) are present in quantities which provide a ratio of moles of component (A-2) per epoxide group contained in component (A-1) of from about 0.1:1 to about 0.75:1.

3. The product of claim 2 wherein
 (i) component (A-1) is a diglycidyl ether of bisphenol A; and
 (ii) component (A-2) is acrylic acid or methacrylic acid.

4. A method for applying a protective coating to a metallic substrate which process comprises (I) applying to said substrate a composition which comprises (A) the reaction product of (1) a material having an average of more than one 1,2-epoxide group per molecule and (2) a monoethylenically unsaturated monocarboxylic acid; (B) an oxidizing agent capable of reacting with sulfur dioxide; optionally (C) an inert diluent or solvent or mixture of inert diluents or solvents; and optionally (D) an accelerator or mixture of accelerators for a free radical forming catalyst and (II) subjecting the thus coated substrate to an atmosphere containing (E) sulfur dioxide in a sufficient quantity and for a sufficient time at a suitable temperature so as to substantially complete a reaction between the epoxide groups contained in the reaction product of component (A-1) and (A-2) as evidenced by the surface of the coating becoming non-tacky; wherein components (A-1) and (A-2) are present in quantities which provide a ratio of moles of component (A-2) per epoxide group contained in component (A-1) of from about 0.01:1 to about 0.9:1; and component (B) is present in quantities of from about 5 to about 50 percent by weight of component (A); component (C), if present, is employed in quantities of from about 5 to about 99 percent by weight of the combined weight of components (A), (B) and (C); and component (D), if present, is employed in quantities of from about 0.001 to about 1 percent by weight of component (A).

5. The method of claim 4 wherein
   (i) component (A-1) is an epoxy resin represented by the following formulas (I), (II), (III) or (IV) or a combination thereof

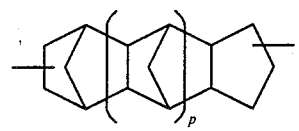

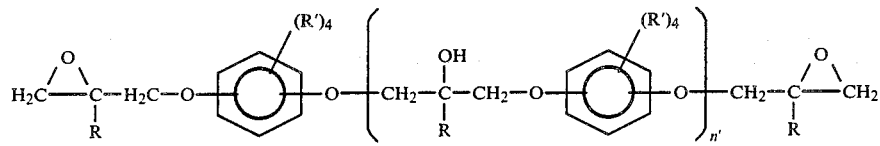 (I)

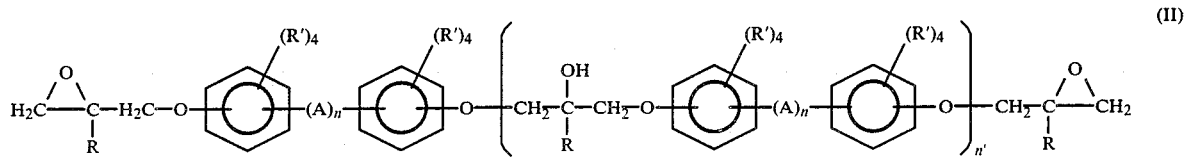 (II)

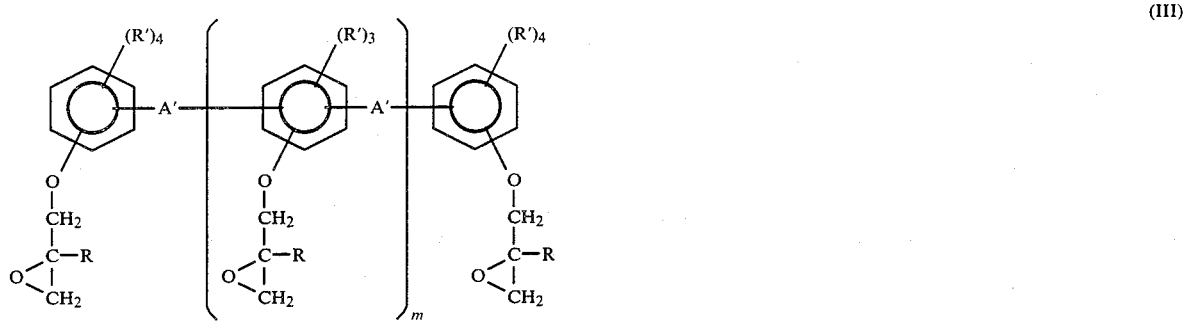 (III)

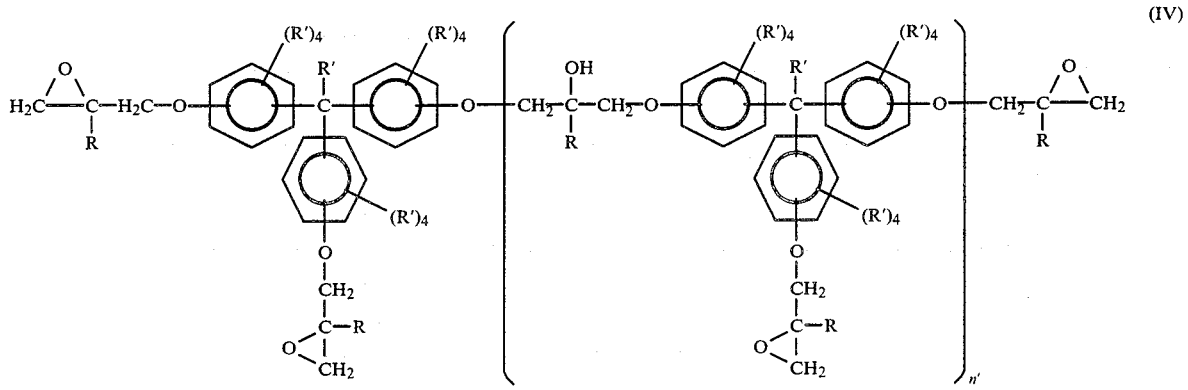 (IV)

wherein each A is independently a divalent hydrocarbon group having from 1 to about 12 carbon atoms,

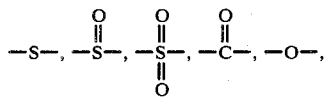

and is independently a divalent hydrocarbon group having from 1 to about 3 carbon atoms or a group; each p has a value of from zero to about 10; each R' is independently hydrogen, a hydrocarbyl or hydrocarbyloxy group having from 1 to about 18 carbon atoms or a halogen; R is independently hydrogen or a hydrocarbyl group having from 1 to about 3 carbon atoms; n has a value of zero or 1; n' has a value from zero to about 40; and m has a value from about 0.001 to about 6;

(ii) components (A-1) and (A-2) are present in quantities which provide a ratio of moles of component (A-2) per epoxide group contained in component (A-1) of from about 0.1:1 to about 0.75:1; and (iii) component (C) is present in quantities of from about 10 to about 30 percent by weight of the combined weight of components (A), (B) and (C).

6. The method of claim 5 wherein (i) component (A-1) is a diglycidyl ether of bisphenol A; and (ii) component (A-2) is acrylic acid or methacrylic acid.

7. The product resulting from subjecting a coated substrate prepared as in claim 4 to a temperature of from 50° C. to about 250° C. for from about 0.08 minute to about 60 minutes.

8. The product resulting from subjecting a coated substrate prepared as in claim 5 to a temperature of from 50° C. to about 250° C. for from about 0.08 minute to about 60 minutes.

9. The product resulting from subjecting a coated substrate prepared as in claim 6 to a temperature of from 50° C. to about 250° C. for from about 0.08 minute to about 60 minutes.

* * * * *